Sept. 24, 1940.   J. VONTOBEL ET AL   2,216,060
MOLD CARRIER IN DIE CASTING MACHINES UNDER PRESSURE
Filed May 27, 1938   2 Sheets-Sheet 2

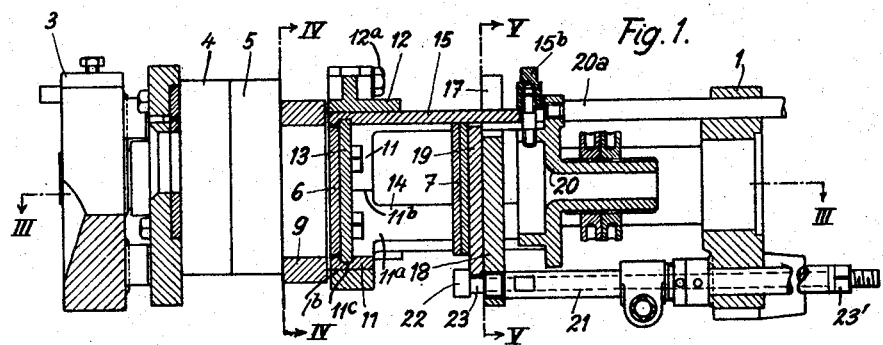
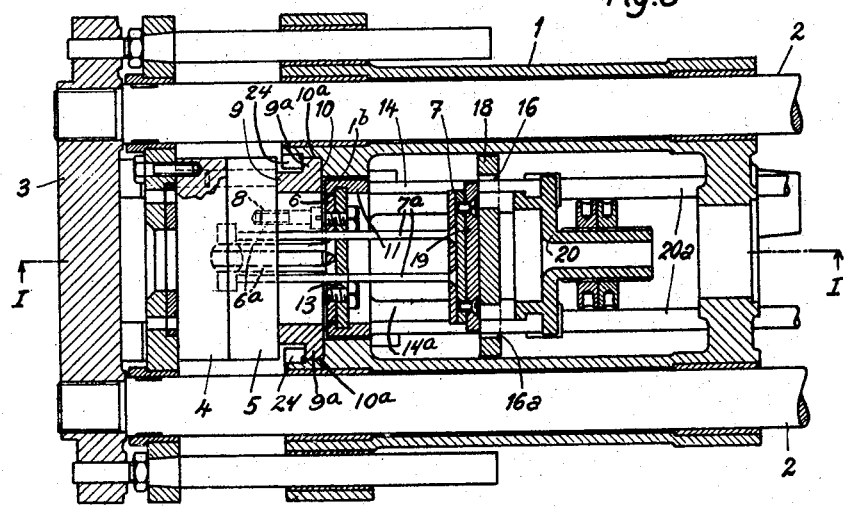
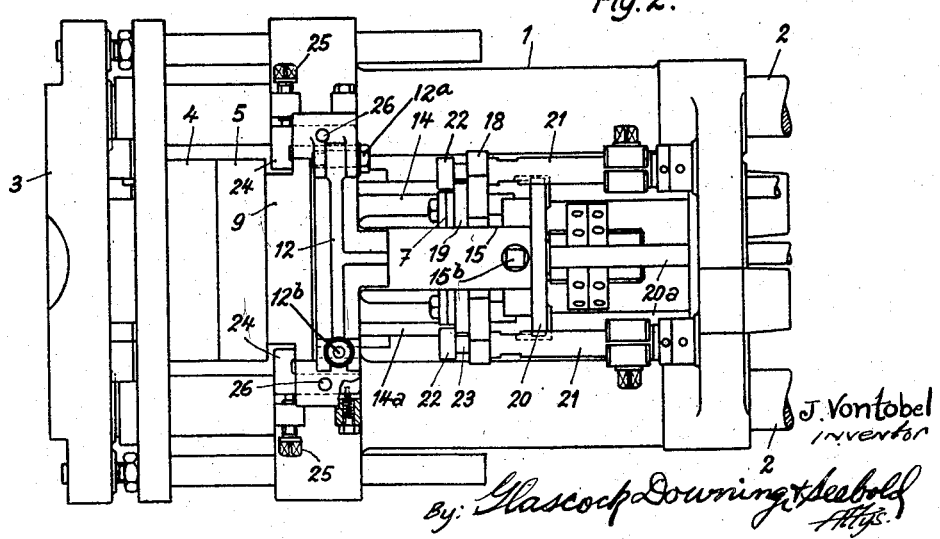

J. Vontobel
INVENTOR

By: Glascock Downing & Seebold
Attys.

Patented Sept. 24, 1940

2,216,060

UNITED STATES PATENT OFFICE 2,216,060

MOLD CARRIER IN DIE CASTING MACHINES UNDER PRESSURE

Jakob Vontobel, Teufenthal, Switzerland, assignor to the firm Injecta Aktiengesellschaft, Teufenthal, Canton of Argovie, Switzerland Application May 27, 1938, Serial No. 210,530
In Switzerland May 29, 1937

4 Claims. (Cl. 22—92)

The present invention relates to a mold carrier in die casting machines under pressure.

There are die casting machines under pressure in which the movable half of the mold is carried by a slide controlled by a manually or hydraulically operated closing mechanism and is pressed against the stationary mold by hydraulic pressure. This movable half of the mold is mostly provided with devices (such as the pins for the cores and pins for the expelling of the casting) which must be brought into a relation with certain determined portions of said slide.

All these devices combined with the movable half of the mold and which according to the length of the core must be greatly extended to the outside of said mold, rendered the mounting of said movable mold difficult. After having dismounted a part of the machine it was necessary to introduce said mold from the front side and to find means for adjusting the correct relative position of mold and accessories. The fixing of a new mold was always a tedious task which often needed further correction after having made several test castings.

The present invention consists in a mold carrier in which the movable half of the mold is carried by a slide combined with the closing mechanism of the mold and which is characterized in that all parts which have to receive said half of the mold and the device for the withdrawal of the cores and the expelling of the casting are accessible to permit that the mentioned devices may be put easily into their place from above.

Preferably the core withdrawing means and the expeller plates are combined in such a way that they permit the simultaneous introducing of all the devices from above and the subsequent fastening of these portions of the movable mold.

The annexed drawings illustrate an embodiment of a mold carrier according to the invention and combined with a hydraulically operated machine but of course this could also be a hand operated machine.

Figure 4:
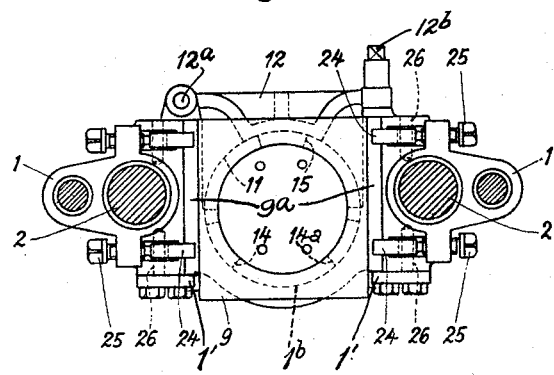
Figure 5:
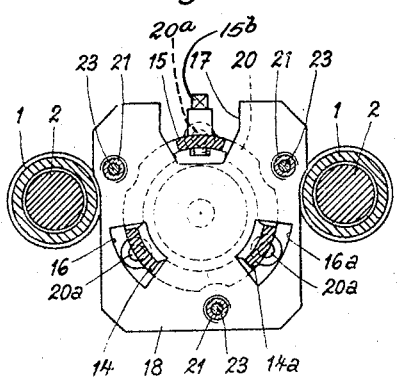

Fig. 1 is a sectional elevation on line I—I of Fig. 3 the core withdrawing and expelling devices being removed, Fig. 2 a plan of the parts shown in Fig. 1, Fig. 3 a plan section on line III—III in Fig. 1 the withdrawing and expelling devices being shown, Fig. 4 a section on line IV—IV in Fig. 1 and Fig. 5 a section on line V—V in Fig. 1.

According to the drawing a slide 1 is slidably held by rods 2 to press the movable mold portion 5 by means of a piston in a pressure cylinder not shown against the stationary portion 4 held by the left standard 3 of the machine. This slide is arranged to receive the whole movable mold portion comprising (see Fig. 1) the half 5 of the mold, the device 6 for withdrawing the cores and the expelling device 7 for expelling the casting the devices including, respectively, the usual core pins 6a and ejector pins 7a as shown in Fig. 3.

The movable mold portion 5 is fastened with screws 8 to an intermediate piece 9 having vertical flanges 9a removably clamped against a shoulder 10 of a vertical guide slot in 10a in the slide 1. Behind this intermediate piece 9 the slide has a bore 1b to receive and guide the two-part body member 11—11a of the core withdrawing device. The upper half of the wall forming the bore 1b is in the form of a holder pivotally mounted at 12a whereby it may be swung to open position to afford access to the core withdrawing and expelling devices as will be hereinafter more fully described. The holder 12 is held in operative position by a clamping bolt 12b.

The core withdrawing plate 13 is fitted into a groove 11c of the two part body member and is provided with several cores extending into the mold. This arrangement is known and shall not be described.

The upper and lower parts 11—11a are divided along the line 11b, Fig. 1, and the upper part is removable. A segment 15 forming a portion of the upper body part and two segments 14 and 14a forming portions of the lower body part pass through openings 16, 16a and 17 of a frame 18 which, together with the expeller plate 19 constitute the expelling device. The segments 14 and 14a are fixed to a connecting piece 20 and the third segment 15 is removably secured thereto by a bolt 15b. The connecting piece 20 is attached to the ends of rods 20a. By this arrangement the said member is connected to the pressure cylinder by means not represented.

The described construction shows that after opening the holder 12 the movable mold portion 5 can be inserted from above into the guides 10a of the slide, where the intermediate piece 9 is held, the core withdrawing plate 13 can be inserted into the groove 11c of the two part core withdrawing member 11, 11a, and the expeller plate 19 can be slid along the expelling frame 18. Having inserted this mold portion the core withdrawing member may be clamped fast by applying the bolt 12b to the hinged holder 12. The expeller plate 19 is now located between the expeller frame 18 and the eccentrics 22 secured to the rods 23 passing through the hollow rods 21 and may then be clamped fast by tightening the screws 23' of the rods 23.

At the front end the intermediate piece 9 is clamped fast against the shoulder 10 by means of angular levers 24 in the axial direction of the mold. These levers 24 are swingingly mounted on slide 1 by means of pivots 26. This clamping is effected by means of pressure screws 25 operating inwardly on the levers. Since the pivot 26 of these levers is located at the end of its longer arm which is parallel with the longitudinal axis of the machine the screwing up of said screws will clamp the intermediate piece 9 down upon shoulder 10. According to Fig. 4 there are four levers 24 symmetrically arranged in relation to the rods 2 thus affording a secure fastening of the movable mold. Besides this, intermediate piece 9 bears against the parts 1' of slide 1.

Due to the core withdrawing member being made in two parts and due to the hinged holder 12, the inserting of the whole mold from above into the slide offers no difficulties. Also the combination of this core withdrawing device with the expeller frame forms a secure fastening of the expelling tools.

In the present embodiment of the invention the core withdrawing member is tubular. This is technically the best form, but the invention is not limited to this form. The connection with the closing cylinder could also be effected across the expeller frame.

What I claim is:

1. In a machine for die casting under pressure having a movable mold-portion and a core-plate and core-pins and an ejector-plate and ejector-pins, a slide open at the top, carrying said movable mold portion, a hollow two-part core withdrawing member slidably arranged in said slide and carrying said core-plate, one part of the withdrawing member being removably positioned on the other part after having inserted the movable mold-portion and core-plate with core-pins and the ejector-plate with the ejector-pins from above, and a hinged holder mounted on said slide and adapted to be turned down and fastened to the slide when the parts of the core withdrawing member are inserted in the slide.

2. In a machine for die casting under pressure according to claim 1, an ejector frame carrying said ejector plate and lying inside said slide and arranged slidably in relation to said slide, segments on said core withdrawing member, said ejector-frame having openings adapted to let said segments through, and a movable connecting piece at the end of said segments.

3. In a machine for die casting under pressure according to claim 1, an intermediate piece carrying said movable mold-portion, said slide carrying said intermediate piece, angular levers swingingly mounted on said slide, and pressure screws on said slide bearing on said angular levers adapted to clamp fast said intermediate piece on said slide by means of said angular levers.

4. In a machine for die casting under pressure according to claim 1, an ejector-frame carrying said ejector-plate and lying inside said slide and arranged slidably in relation to said slide, hollow-rods adapted to carry said ejector-frame, rods passing through said hollow rods and eccentrics on said rods adapted to clamp fast the ejector-plate when placed between said eccentrics and said ejector-frame.

JAKOB VONTOBEL.